(12) United States Patent
   Alamdar (10) Patent No.: US 11,123,983 B2
(45) Date of Patent: Sep. 21, 2021

(54) INKJET PRINTER WITH SUBSTRATE FLATNESS DETECTION

(71) Applicant: Kateeva, Inc., Newark, CA (US)

(72) Inventor: Mohammad Hadi Alamdar, Cupertino, CA (US)

(73) Assignee: Kateeva, Inc., Newark, CA (US)

( * ) Notice: Subject to any disclaimer, the term of this patent is extended or adjusted under 35 U.S.C. 154(b) by 0 days.

(21) Appl. No.: 16/685,610

(22) Filed: Nov. 15, 2019

(65) Prior Publication Data

US 2020/0198339 A1    Jun. 25, 2020

Related U.S. Application Data

(60) Provisional application No. 62/782,415, filed on Dec. 20, 2018, provisional application No. 62/810,458, filed on Feb. 26, 2019.

(51) Int. Cl.
*B41J 2/125*    (2006.01)
*B41J 3/28*    (2006.01)

(52) U.S. Cl.
CPC ................... *B41J 2/125* (2013.01); *B41J 3/28* (2013.01)

(58) Field of Classification Search
CPC ....................................................... B41J 2/125
See application file for complete search history.

(56) References Cited

U.S. PATENT DOCUMENTS

| | | | |
|---|---|---|---|
| 5,764,264 A * | 6/1998 | Takanaka | B41J 2/01 242/562 |
| 8,690,489 B2 | 4/2014 | Richman et al. | |
| 9,245,786 B2 | 1/2016 | Koelmel et al. | |
| 10,537,911 B2 | 1/2020 | Ko et al. | |
| 2008/0158300 A1 * | 7/2008 | Nakagawa | B41J 2/01 347/51 |
| 2014/0374375 A1 * | 12/2014 | Zwiers | H05K 1/092 216/13 |
| 2018/0229497 A1 | 8/2018 | Darrow et al. | |

FOREIGN PATENT DOCUMENTS

| | | |
|---|---|---|
| JP | 2010087142 A | 4/2010 |
| WO | 2018/009713 A1 | 1/2018 |

OTHER PUBLICATIONS

Notification of Transmittal of the International Search Report and Written Opinion of the International Searching Authority, dated Feb. 4, 2020, for International Application No. PCT/US2019/062089.

* cited by examiner

*Primary Examiner* — Jason S Uhlenhake
(74) *Attorney, Agent, or Firm* — Hauptman Ham, LLP (57) ABSTRACT

An inkjet printer is described. The inkjet printer has a gas cushion substrate support; a print assembly comprising a dispenser with an ejection surface facing the gas cushion substrate support; and a proximity sensor disposed in a surface of the gas cushion substrate support facing the ejection surface. A method is described that includes disposing a workpiece on a gas cushion support of an inkjet printer; supporting the workpiece on a gas cushion above a surface of the gas cushion support; detecting a distance of the workpiece from the surface of the gas cushion support; determining a difference between the distance and a target distance; comparing the difference to a tolerance; and adjusting the distance of the workpiece from the surface of the gas cushion support based on the comparison.

12 Claims, 6 Drawing Sheets

INKJET PRINTER WITH SUBSTRATE FLATNESS DETECTION

CROSS-REFERENCE TO RELATED APPLICATIONS

This patent application claims benefit of U.S. Patent Application Ser. No. 62/782,415 filed Dec. 20, 2018, and U.S. Provisional Patent Application Ser. No. 62/810,458 filed Feb. 26, 2019, each of which is incorporated herein by reference.

FIELD

Embodiments of the present invention generally relate to inkjet printers. Specifically, methods and apparatus for monitoring and control of substrate position and orientation are described.

BACKGROUND

Inkjet printing is common, both in office and home printers and in industrial scale printers used for fabricating displays, printing large scale written materials, adding material to manufactured articles such as PCB's, and constructing biological articles such as tissues. Most commercial and industrial inkjet printers, and some consumer printers, use dispensers to apply print material to a substrate. The dispenser ejects a controlled quantity of print material toward a substrate at a controlled time and rate so that the print material arrives at the substrate in a target location and makes a mark having a desired size and shape.

In some cases, the precision of locating print material on the substrate is extreme. Micro-scale deviations in timing, quantity, or rate of print material ejection can cause printing faults. Similarly, imprecision in positioning the substrate to receive print material can cause the print material to arrive at the substrate off target. For example, if substrate distance from print ejectors is off target, the print material traverses a distance that is not expected, so the print material arrives at the substrate early or late. There is a need for substrate height and flatness control in high precision inkjet printing applications.

SUMMARY

Embodiments described herein provide an inkjet printer, comprising a gas cushion substrate support; a print assembly comprising a print head with a print surface facing the gas cushion substrate support; and a proximity sensor disposed in a surface of the gas cushion substrate support facing the print surface.

Other embodiments described herein provide a method, comprising disposing a workpiece on a gas cushion support of an inkjet printer; supporting the workpiece on a gas cushion above a surface of the gas cushion support; detecting a distance of the workpiece from the surface of the gas cushion support; determining a difference between the distance and a target distance; comparing the difference to a tolerance; and adjusting the distance of the workpiece from the surface of the gas cushion support based on the comparison.

Other embodiments described herein provide a method, comprising disposing a workpiece on a gas cushion support of an inkjet printer; supporting the workpiece on a gas cushion above a surface of the gas cushion support; detecting a first distance of a first zone of the workpiece from the surface of the gas cushion support; detecting a second distance of a second zone of the workpiece from the surface of the gas cushion support; determining a first difference between the first distance and a target distance; determining a second difference between the second distance and the target distance; performing a first comparison of the first difference to a tolerance; performing a second comparison of the second difference to the tolerance; adjusting the first distance based on the first comparison; and adjusting the second distance based on the second comparison.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
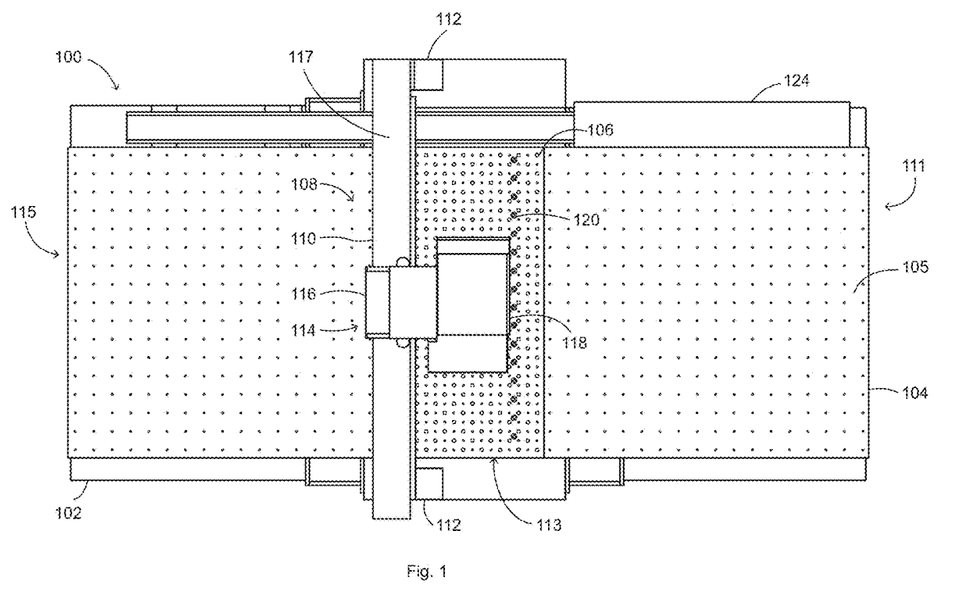
FIG. 1 is a top view of an inkjet printer according to one embodiment.

An inkjet printer is described herein with substrate height and flatness detection features to ensure precision in placement of print material on a substrate. FIG. 1 is a top view of an inkjet printer 100 according to one embodiment. The inkjet printer has a base 102, a substrate support 104, and a print assembly 108. A substrate is disposed on the substrate support 104 and positioned in relation to the print assembly 108 such that material can be ejected from the print assembly 108 onto a surface of the substrate facing the print assembly 108. The substrate is held and manipulated by a holder 124 that removably adheres to the substrate and moves the substrate on the substrate support 104 with respect to the print assembly 108. The base 102 is typically a massive object to minimize vibratory transmissions to the operative parts of the printer 100. In one example, the base 102 is a granite foundation.

The substrate support 104 is located upon the base 102, and comprises a support surface 105 along with means for making the support surface 105 substantially frictionless. Here, the support surface 105 is a gas cushion substrate support that provides a gas cushion on which the substrate floats. The support surface 105 features a plurality of holes 106 that allow jets of gas to exit, thus providing an upward force to counteract the pull of gravity on the substrate and maintain the substrate at a desired elevation above the support surface 105. Some of the holes may also allow controlled withdrawal of gas from the gas cushion floating the substrate support to provide precise local control of substrate elevation.

In the embodiment of FIG. 1, a first portion 111 of the gas cushion substrate support 104 has holes 106 coupled to a gas source, such that the holes 106 in the first portion 111 are gas ejection holes. The gas ejection holes direct gas to a space between the support surface 105 and the substrate at a pressure that elevates the substrate above the support surface 105. A second portion 113 has holes 106 that include gas ejection holes and gas evacuation holes, which are coupled to a vacuum source. The gas evacuation holes provide a means for reducing the pressure of the gas cushion to control height of the substrate above the support surface 105 more precisely. The gas evacuation holes are typically interspersed with the gas ejection holes. The second portion 113 is proximate to the print assembly 108 such that substrate positioning can be controlled while material is being deposited on the substrate. A third portion 115 of the substrate support has holes 106 that are gas ejection holes. Here, the second portion 113 is between the first portion 111 and the third portion 115, and while the second portion 113 has gas evacuation holes, the first and third portions 111 and 115 do not have gas evacuation holes. The first and third portions 111 and 115 allow staging of substrates to be moved into printing position adjacent to the second portion 113, where substrate positioning is more closely controlled.

The print assembly 108 comprises a dispenser assembly 114 disposed on a print support 110. The print support 110 is disposed in relation to the substrate support 104 to provide access for the dispenser assembly 114 to position constructively in relation to a substrate on the substrate support 104 so that print material can be precisely applied to the substrate. Here, the print support 110 includes a rail or beam 117 that traverses the substrate support 104, allowing the dispenser assembly 114 to traverse the substrate support 104 and deposit print material at any location on the substrate from one side of the print support 110 to the opposite side thereof. The print support 110 also includes two stands 112 that position the rail 117 a fixed distance from the substrate support 104. The two stands 112 extend from the base 102, on opposite sides of the substrate support 104, to the rail 117, which extends across the substrate support 104. The stands 112 and the rail 117 can both be made of the same material as the base 102. In this case, the stands 112, the rail 117, and the base 102 are integrally formed from one piece of granite.

The dispenser assembly 114 typically includes one or more dispensers 118 that ride along the rail 117 by operation of a print carriage 116 that couples with the print support 116 to translate the dispensers 118 along the rail 117 from one end of the rail to the other opposite end. The print assembly 108 can also include sensors coupled to the print support 110, the dispenser assembly 114, or both, to control positioning of the dispenser assembly 114 and ejection of material from the dispenser assembly 114. The various sensors coupled to the print assembly 108 are not shown to simplify the figures.

A substrate is positioned under the print assembly 104 by the holder 124. The holder assembly 124 acquires secure contact with the substrate upon loading and moves the substrate along the substrate support 104, floating substantially without friction on the gas cushion, to position the substrate with respect to the print assembly 108 for dispensing print material onto the substrate in a precise fashion. The holder 124, in this case, is located on one side of the substrate support 104 and generally extends along the substrate support 104 to translate the substrate along the substrate support during printing. The dispensers 118 generally move across the substrate support along the rail 117 to position the dispensers 118 as the substrate moves by the print assembly 104. In some cases, the dispensers 118 may move only between passes of the substrate by the print assembly 108. In other cases, the dispensers 118 may move during passes of the substrate by the print assembly 108.

A system controller 129 receives signals from various sensors that may be deployed throughout the printer 100 and sends signals to the systems of the printer 100 to control printing. Here, the system controller 129 is shown operationally coupled to the print assembly 108 and to the holder 124. Each of the substrate support 104, the print assembly 108, the holder 124, and potentially other ancillary systems such as environment control and materials management systems, may have sensors operatively coupled to the system controller 129 to transmit signals to the system controller 129 related to the status of various components during a print operation. The system controller 129 includes data and instructions to determine control signals to send to various controlled components of the printer 100.

The system controller 129 is a digital processing system that has a one or more processors, data storage and communication systems, and optionally networking systems for sending and receiving signals and data to and from the printer 100, and optionally to other processing systems. The system controller 129 may be operatively coupled to sensors and control components by wiring, or wirelessly.

When printing on a substrate, it is often desired to place microscopic droplets of print material, for example print material droplets having diameter of 5-10 μm in an area of the substrate of dimension 10-15 μm. In this operation, the print material is typically dispensed while the substrate is moving to minimize print time. This extreme precision is complicated by tiny imperfections in the dimensions of the various parts of the print system, variation of those dimensions with temperature, imprecision in speed of translation of the substrate, the dispenser assembly, and the holder assembly 106, and imprecision in the distance of the substrate from the dispensers 118. If distance of the dispensers 118 to the substrate is not precisely known or controlled, droplet velocity of print material from the dispensers 118 cannot be programmed for the print material droplet to arrive at the target location when the substrate is in the proper position. The droplet arrives too early or too late and misses the target.

Apparatus and methods for determining distance of the substrate from the substrate support, sometimes referred to as "fly height" when the substrate is floated on a gas cushion, are described herein. One or more proximity sensors 120 is included in the substrate support 102. The proximity sensors 120 are disposed in the support surface 105 of the substrate support 102 to probe the substrate and ascertain the distance from each proximity sensor 120 to the substrate. The proximity sensors 120 may be any type of sensor capable of sensing the distance to a substrate. Examples include capacitive sensors, acoustic sensors such as ultrasonic sensors, pressure or flow sensors, and laser sensors such as confocal laser sensors. Other optical sensors can also be used. Where a plurality of proximity sensors 120 is used, the sensors 120 are aligned across the substrate support 104 in a line parallel to an edge 126 of the dispensers 118.

Each dispenser 118 is generally an object with a regular shape, for example like a rectangular box or a cylinder, with an ejection surface (not visible in FIG. 1) that faces the support surface 105 of the substrate support 104. The ejection surface contains one or more ejection nozzles for ejecting print material from the dispenser 118 toward the substrate disposed on the substrate support surface 105 proximate to the print assembly 114. The ejected print material travels from the ejection surface to the substrate, crossing a gap in a time set by the size of the gap and the exit velocity and trajectory of the print material. The substrate is typically moving when the print material is ejected from the ejection nozzles. To control where the print material deposits on the substrate, the size of the gap between the ejection surface and the substrate must be at least known, and preferably controlled. If the size of the gap is known, ejection time and/or velocity can be computed to result in the print material arriving at the substrate at the right time for the print material to be located on target. If the ejection surface has more than one ejection nozzle distributed across the ejection surface, and therefore distributed over an area of the substrate, variation in the size of the gap can complicate timing of material ejection from the various print nozzles. To the extent the size of the gap can be made constant across the print area, the area spanned by the ejection nozzles, the task of depositing print material precisely at a target location on the substrate is simplified.

The proximity sensors 120 are disposed at a "leading" edge of the dispensers 118. The leading edge of the dispensers 118 is the edge of the dispensers that first comes over a portion of the substrate as the substrate moves by the dispensers 118 during a printing pass. The proximity sensors 120 are disposed at the leading edge of the dispensers so that substrate distance from the substrate support can be controlled prior to ejecting print material from the ejection surface of the dispensers 118.

Figure 2A:
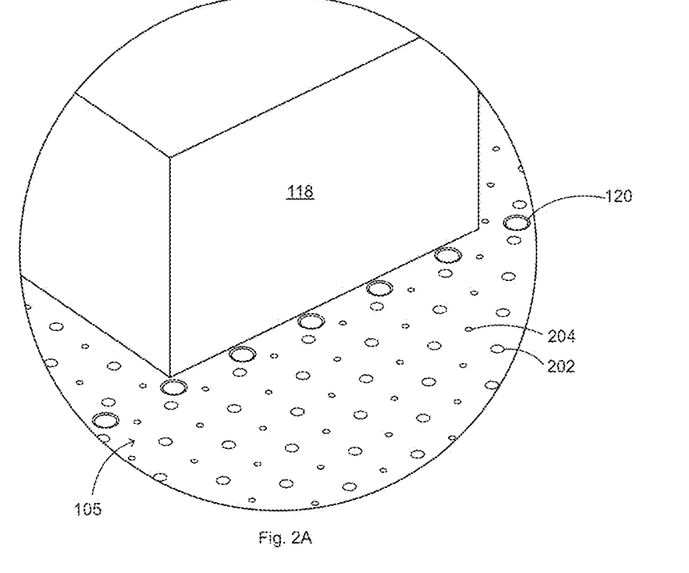
FIG. 2A is a detailed view of a portion of the inkjet printer of FIG. 1.

FIG. 2A is a perspective view of a portion of the inkjet printer 100. The proximity sensors 120 are located in the substrate support surface 105 between the holes 106. Here, a first plurality of holes 202 provides gas to the substrate support surface 105 and a second plurality of holes 204 provides suction to evacuate gas from the substrate support surface 105. The first plurality of holes 202 and the second plurality of holes 204 are interspersed in a grid pattern oriented in the scanning and cross-scan directions. The proximity sensors 120 are located between rows of holes 106 along the cross-scan direction. Here, the proximity sensors 120 are arranged with two columns of holes 106 between adjacent proximity sensors 120. The density of proximity sensors 120 can be uniform or non-uniform, and can be greater or less than that shown in FIG. 2A. Here, the row of proximity sensors 120 is located about midway between two rows of holes 106 in the cross-scan direction, but any convenient placement of proximity sensors 120 can be used. The proximity sensors 120 have a circular shape in this example, but can be any shape, such as oval, rectangular, polygonal, or irregular.

Figure 2B:
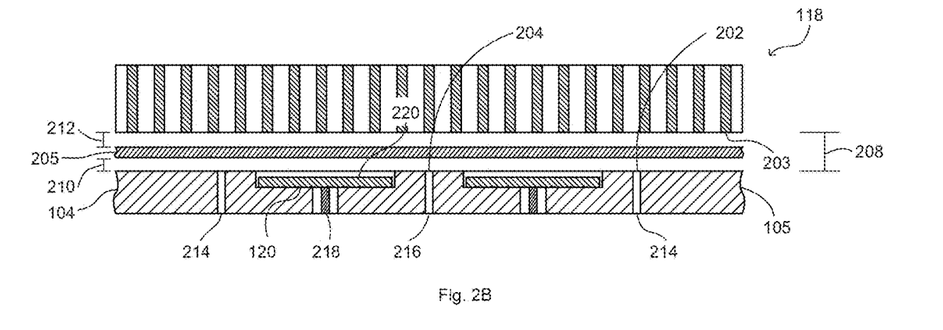
FIG. 2B is a cross-sectional view of the portion of FIG. 2A.

FIG. 2B is a cross-sectional view of a portion of an inkjet printer according to another embodiment. A substrate 205 is shown disposed between an ejection surface 203 of the dispenser 118 and the substrate support surface 105 of the substrate support 104. The proximity sensors 120 are shown disposed in the surface 105. The substrate 205 is in a clearance gap 208 between the ejection surface 203 and the surface 105. The substrate 205 is supported above the support surface 105 by gas flowing through gas flow openings 214 disposed in the substrate support 104. The gas produces a gas cushion in a gas cushion gap 210. The gas cushion has a pressure that counteracts the force of gravity tending to pull the substrate 205 toward the support surface 105. When the pressure of the gas cushion exceeds the weight of the substrate 205 in any local area, the dimension of the gas cushion gap 210 increases to equalize the pressure with the weight of the substrate 205, and vice versa. Gas is evacuated through gas evacuation conduits 216. Here, two gas flow openings 214 and one gas evacuation conduit 216 are shown in line in the cross-scan direction with the proximity sensors 120, with one opening 202 or 204 between adjacent sensors 120. Multiple such gas flow openings 214 and gas evacuation conduits 216 are typically used.

Each proximity sensor 120 is shown disposed in a recess 220 formed in the support surface 105. The proximity sensor 120 has a thickness and the recess 220 has a depth. Here, the depth of the recess 220 is greater than the thickness of the proximity sensor 120. Thus, a distance from a surface of the proximity sensor 120 facing the ejection surface 203 to the ejection surface 203 is greater than the thickness of the gas cushion gap 210. In one aspect, the recess has a depth up to 50 µm. In another aspect, the distance from the surface of the proximity sensor 120 to the ejection surface 203 is up to 50 µm. A circuitry conduit 218 is paired with each proximity sensor 120 to carry power and/or signals to and from each proximity sensor 120.

Figure 2C:
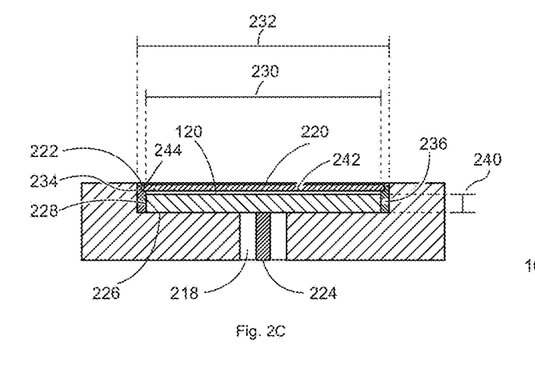
FIG. 2C is a detailed cross-sectional view of a proximity sensor of FIG. 2B.

FIG. 2C is a detail view of one of the proximity sensors 120 of FIG. 2A. The recess 220 has a width 232 that exceeds a dimension 230 of the proximity sensor 220. A wall 234 of the recess and an edge 236 of the proximity sensor 120 thus form a gap 222 that is about 1-10 µm in dimension. The gap 222 may have equal dimension at all points on the perimeter of the proximity sensor 120, or the dimension of the gas 222 may vary around the perimeter of the proximity sensor 120. The gap 222 provides freedom for the proximity sensor 120 to expand and contract under thermal cycling without stressing the material of the support surface 105 in the event the material of the proximity sensor 120 and the material of the substrate support surface 105 have different thermal expansion coefficients. Such tolerance will prevent any breakage of the support surface material 105 or expulsion of the proximity sensor 120 from the support surface 105 due to thermal stress during thermal cycling. The proximity sensor 120 may be secured within the recess 220 in any convenient way, for example by applying an adhesive to a lower surface 226 of the recess 220 to adhere the proximity sensor 120 to the lower surface. A compliant material 228 can also be disposed in the gap 222 to create a friction fit between the edge 236 of the proximity sensor 120 and the wall 234. Wiring 224 reaches the proximity sensor 120 through the circuitry conduit 218. Tolerance may be provided in the circuitry conduit 218 to allow for thermal expansion of the wiring 224 and/or the substrate support 104.

A cover 242 may be used in connection with the proximity sensor 120. The cover 242 inserts into the recess 220 and blocks any gas from escaping through the circuitry conduit 218. Here, the cover 242 is shown seating into the compliant material 228. In this case, the compliant material 228 has a notch 244 that accommodates the cover 242. The cover 242 may be made of any structurally strong material that can block the flow of gas through the recess 120 and the circuitry opening 218, and does not otherwise interact with the process. Glass, ceramic, rubber, and plastic could all be used. Any effect of the cover 242 on operation of the proximity sensor 120 can be compensated through calibration. For example, if the proximity sensor 120 is a capacitive sensor, the capacitive effect of the cover can be ascertained by operating the proximity sensor 120 with no substrate over the sensor. The reading associated with the presence of only the cover 242 can thus be subtracted from capacitance readings to determine the elevation of a substrate.

Figure 2D:
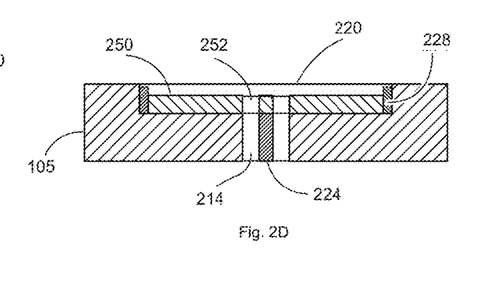
FIG. 2D is a detailed cross-sectional view of a proximity sensor according to another embodiment.

FIG. 2D is a detail view of a proximity sensor 250 according to another embodiment. This version is similar to the version of FIG. 2C, except that in FIG. 2D the proximity sensor 250 has a plurality of holes 252 formed through the sensor. In this case, the proximity sensor 250 is disposed in a recess 220 that aligns with one of the gas flow openings 214. Two holes 252 are shown in cross-section, but any number of holes may be used, for example arranged in a ring around the wiring 224. The holes 252 are fluidly coupled to the gas flow opening 214 such that gas flows through the holes 252 and out of the recess 220 to form a gas cushion to support a substrate. The wiring 224 is routed through the gas flow opening 214. The compliant material 228 in this case helps to hold the proximity sensor 250 in the recess 220 and prevents the pressure of gas in the gas flow opening 214 from lifting the proximity sensor 250 out of the recess 220. This configuration may also be used with the gas evacuation conduits 216.

Figure 3:
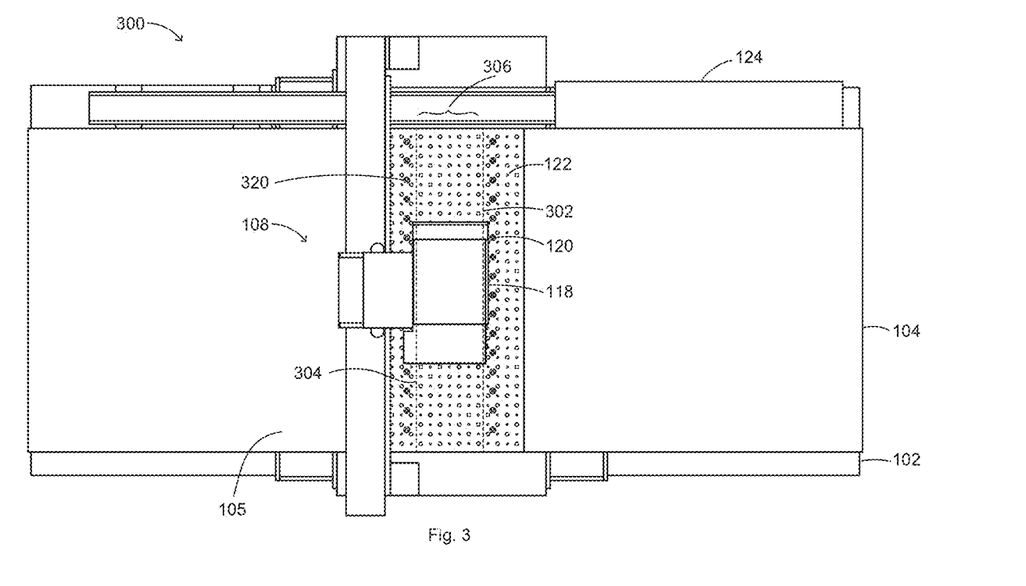
FIG. 3 is a top view of an inkjet printer according to another embodiment.

FIG. 3 is a top view of an inkjet printer 300 according to another embodiment. The inkjet printer 300 is similar in many respects to the inkjet printer 100, and similar elements are labelled with the same reference numerals. The chief difference between the printer 100 and the printer 300 is the inclusion of a second plurality of proximity sensors 320 in the substrate support surface 105. The dispenser 118 defines a print zone 306 along the substrate support surface 105 where the dispenser 118 can eject print material onto a substrate disposed on the substrate support surface 105. The print zone 306 has a first edge 302 and the second edge 304, defined by the extremities of the dispenser 118. A first plurality of proximity sensors 120 is disposed in the substrate support surface 105 near the first edge 302 of the print zone. A second plurality of proximity sensors 320 is disposed in the substrate support surface 105 near the second edge 304. In this case, all the proximity sensors of the first and second pluralities 120 and 320 are located outside the print zone 306. All the proximity sensors 120 and 320 may be the same kind of proximity sensor, for example capacitive sensors, or different kinds of proximity sensors can be used.

The first plurality of sensors 120 is positioned proximate to the first edge 302 of the print zone 306 to provide position control for a substrate approaching the print zone 306 from the first portion 111 of the gas cushion support 104. As the holder 124 moves the substrate toward and through the print zone 306 from the first portion 111, portions of the substrate approaching the print zone 306 come into proximity of the first plurality of sensors 120 before moving into the print zone 306. The sensors 120 sense the fly height of the portion of the substrate moving by the sensors 120, and any variation thereof, and control action can be taken, as described elsewhere herein, to control flatness and fly height of the portion as it moves into the print zone 306.

The second plurality of sensors 320 is positioned proximate to the second edge 302 of the print zone 306 to provide position control for a substrate approaching the print zone 306 from the third portion 115 of the gas cushion support 104. As the holder 124 moves the substrate toward and through the print zone 306 from the third portion 115, portions of the substrate approaching the print zone 306 come into proximity of the second plurality of sensors 320 before moving into the print zone 306. The sensors 320 operate similarly to the sensors 120 described above to provide fly height and flatness control for substrate portions moving into the print zone 306 from the third portion 115 of the gas cushion support 104. In this way, the printer 400 provides position and position variation control for substrates passing through the print zone 306 in both directions.

Figure 4A:
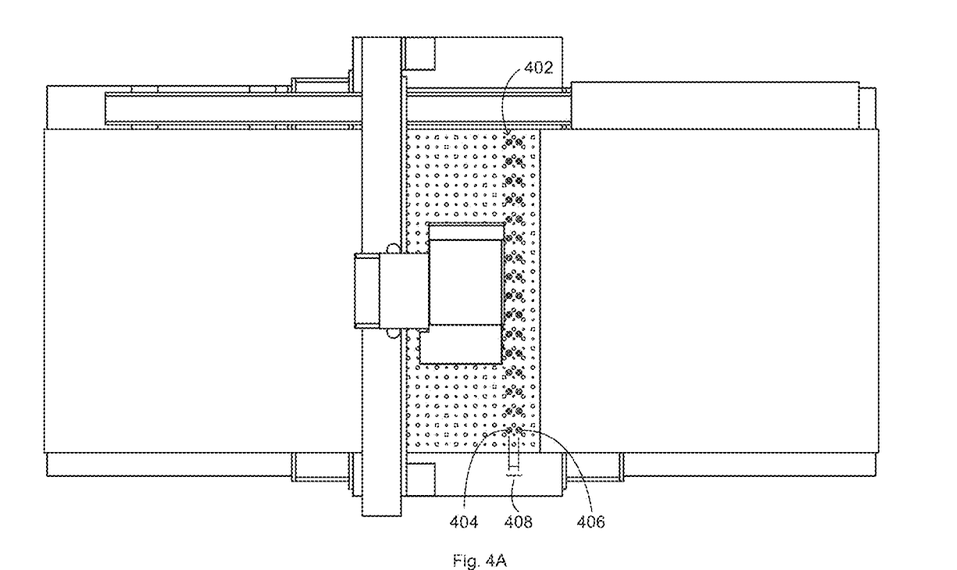
FIG. 4A is a top view of an inkjet printer according to another embodiment.

FIG. 4A is a top view of an inkjet printer 400 according to another embodiment. The inkjet printer 400 is similar in many respects to the inkjet printers 100 and 300 described above. The key difference of the inkjet printer 400 is the use of multiple sets of proximity sensors on one side of the print zone. The inkjet printer 400 has a proximity sensor array 402 that comprises a first set 404 of proximity sensors and a second set 406 of proximity sensors. The two sets of proximity sensors 402 and 404 are each arranged in a line across the support 104 in the cross-scan direction, with the second set 406 further from the print zone than the first set 404.

The proximity sensor array 402 can be used to control position of a substrate during processing in the printer 400. A substrate is positioned on the first portion 111 of the support 104. The holder 124 is used to move the substrate toward the print zone. As the substrate moves toward and through the print zone, portions of the substrate come into proximity of the second set 406 of proximity sensors. The second set 406 is used to determine fly height of the portion of the substrate, and variation thereof. Based on the signals from the second set 406 of proximity sensors, control actions can be taken to adjust the fly height and reduce variation thereof before the substrate portion moves into the print zone. The first set 404 of proximity sensors can be used to check the effectiveness of the control actions taken to adjust fly height and variation thereof, and a second set of control actions can be taken to perfect substrate positioning prior to depositing print material on the substrate in the print zone.

Figure 4B:
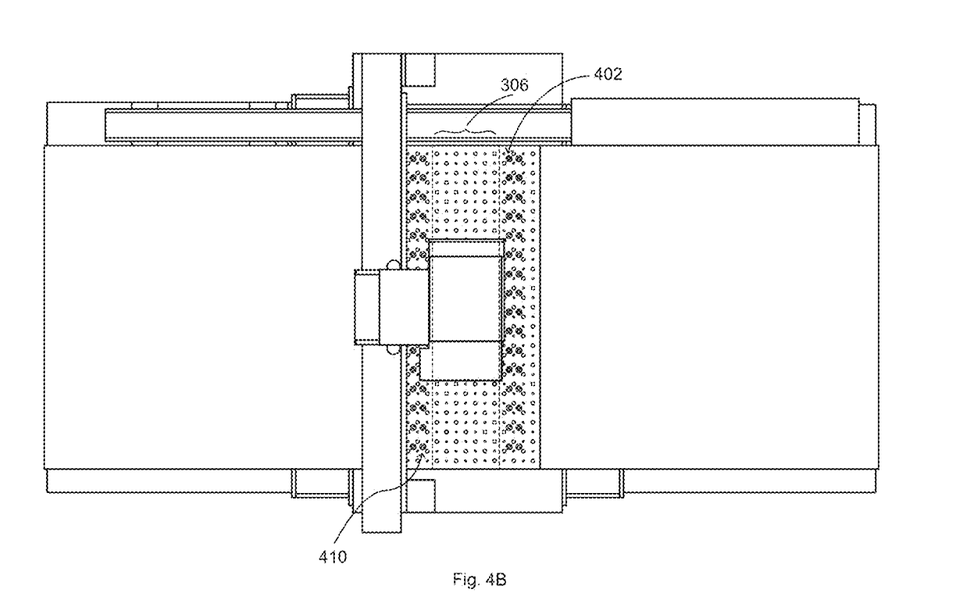
FIG. 4B is a detailed view of a portion of the inkjet printer of FIG. 4A.

FIG. 4B is a top view of an inkjet printer 450 according to another embodiment. The inkjet printer 450 is similar to the inkjet printers 300 and 400 described above, using multiple sets of proximity sensors. In this case, two arrays or proximity sensors 402 and 410 are used. The first array 402 is on one side of the print zone, while a second array 410, similar to the first array 402, is located on the opposite side of the print zone to provide the same control functionality available from the first array 402 for substrates approaching the print zone from the third portion 115 of the support 104.

In FIGS. 4A and 4B, the two sets of proximity sensors in an array are separated by a distance 408 (FIG. 4A). The distance 408, in this case, is approximately equal to the distance between two adjacent rows of gas/vacuum holes, in this case about 2 cm apart. The distance 408 may be any convenient distance, which may be influenced by the properties of the substrate being processed along with the capabilities of the gas cushion support. For example, if the gas cushion support is able to maintain large pressure gradients in the gas cushion, the gas cushion support will have greater capability to make short-range corrections in fly height, globally and locally, for a given substrate so the sets of proximity sensors may be located close together. The flexibility of the substrate will also determine the pressure gradient needed to adjust fly height or flatness of the substrate. The sets of proximity sensors may be separated by two, three, or more rows of gas/vacuum holes.

Figure 5:
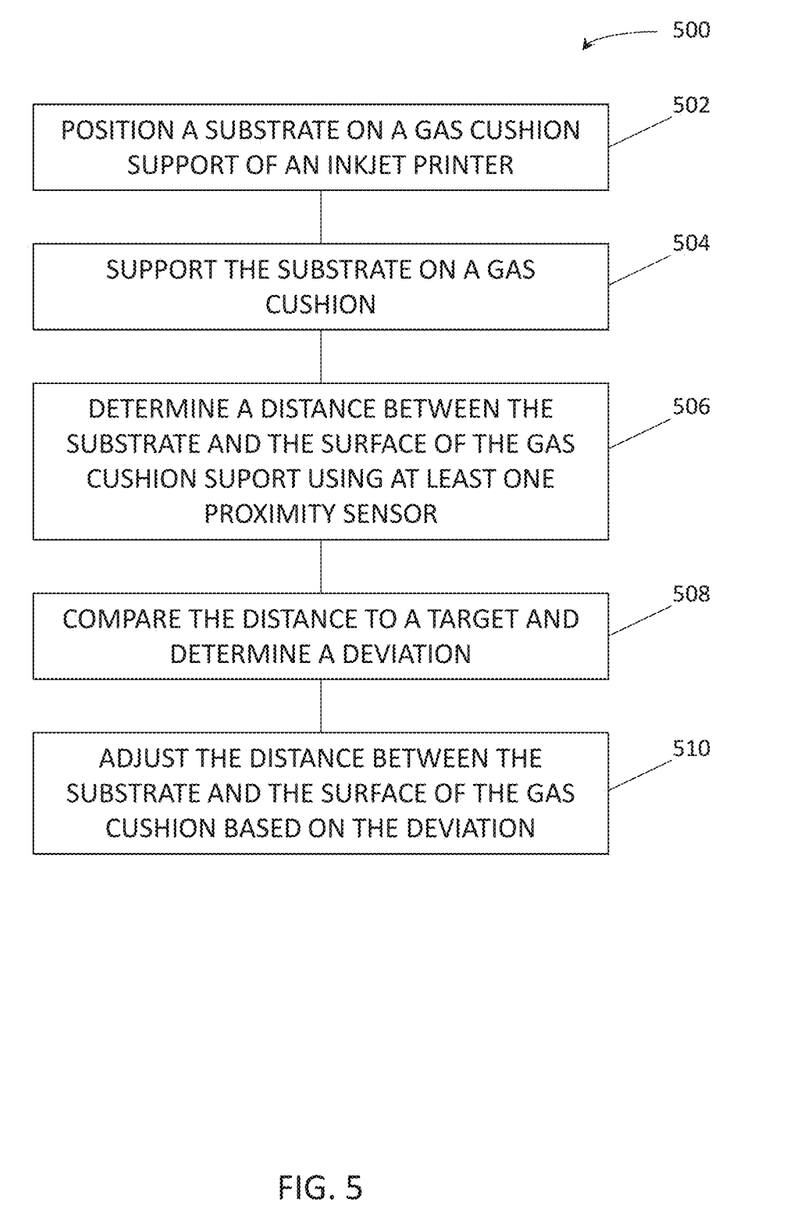
FIG. 5 is a flow diagram summarizing a method according to one embodiment.

FIG. 5 is a flow diagram summarizing a method 500 according to one embodiment. The method 500 can be used for depositing material on a substrate in an inkjet printing process. A substrate is positioned on a gas cushion support at 502. The gas cushion support is disposed to position the substrate for deposition of print material from a dispenser juxtaposed with the substrate support. At 504, the substrate is supported on a gas cushion formed above the surface of the gas cushion support. The gas cushion is formed by providing a gas under pressure to the space between the substrate and the gas cushion support to counteract the force of gravity tending to pull the substrate toward the gas cushion support.

The flow of gas to the gas cushion support forms a gas cushion having a volume that equalizes the pressure of the gas cushion with the weight of the substrate. If the flow of gas is increased, the pressure momentarily rises between the substrate and the gas cushion support, so the upward force on the substrate exceeds the force of gravity on the substrate and the substrate accelerates upward. As the substrate accelerates upward, the volume of the gas cushion grows and its pressure falls until the pressure of the gas cushion equalizes with the weight of the substrate. If the flow rate is diminished, the pressure momentarily drops and the substrate lowers to reduce the volume of the gas cushion and equalize the pressure.

The time to equalize the pressure of the gas cushion at a new thickness is dependent on the flow rate of gas through the space between the substrate and the support surface. The flow rate can be increased, and the time decreased, by connecting a vacuum source with the space in which the gas cushion is formed. In this way, the speed of changing the gas cushion volume can be accelerated by employing gas flow and vacuum.

At 506, a distance between the substrate and the surface of the gas cushion support is determined. The distance can be determined by using proximity sensors disposed in the support surface. The proximity sensors can be capacitive sensors, acoustic sensors, or a combination thereof.

At 508, the distance between the substrate and the surface of the gas cushion support, determined at 506, is compared to a target and a deviation is determined. At 510, the distance between the substrate and the surface of the gas cushion is adjusted based on the deviation. If the deviation is above a tolerance, which may be zero, gas flow to the gas cushion and/or vacuum application to the gas cushion are adjusted, and the change in distance monitored, until the deviation is within tolerance.

In some cases, multiple proximity sensors may be used. For example, a first proximity sensor may be used to determine a first distance and a second proximity sensor may be used to determine a second distance. The two distances may have different targets. For example, if the first proximity sensor is further from the print zone than the second proximity sensor, the deviation tolerance for the first proximity sensor may be higher than for the second proximity sensor. In such cases, the distance of an area of the substrate will be more tightly controlled as the area approaches the print zone. The distance will be controlled to a first tolerance as the area passes the first proximity sensor, and will then be controlled to a second, stricter, tolerance as the area passes the second proximity sensor and moves into the print zone.

Figure 6:
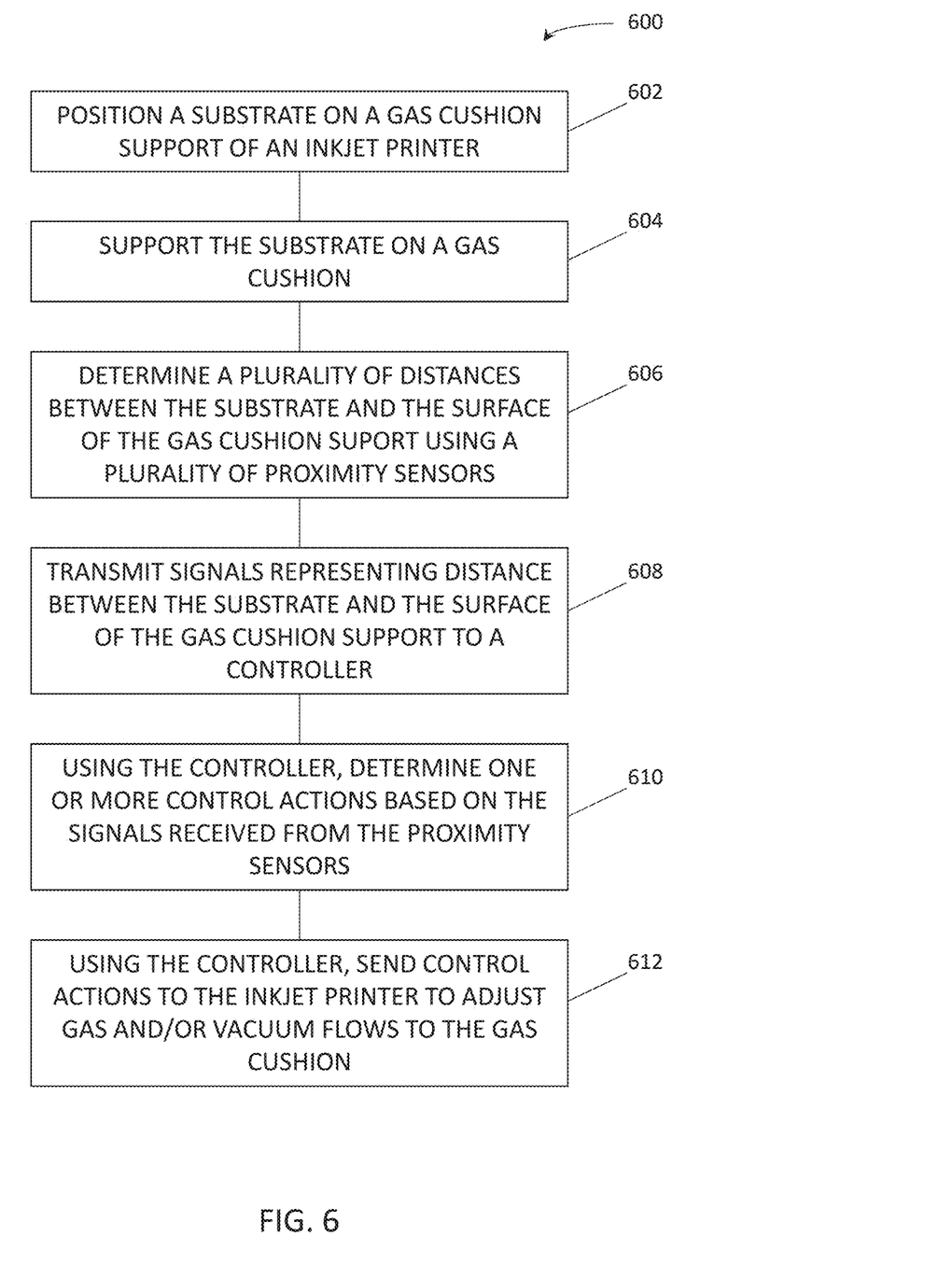
FIG. 6 is a flow diagram summarizing a method according to another embodiment.

FIG. 6 is a flow diagram summarizing a method 600 according to another embodiment. The method 600 can be used to control variation in substrate positioning for an inkjet printing process. A substrate is positioned on a gas support cushion at 602. The gas cushion support is disposed to position the substrate for deposition of print material from a dispenser juxtaposed with the substrate support. At 604, the substrate is supported on a gas cushion formed above the surface of the gas cushion support. The gas cushion is formed by supplying a gas between the substrate and the gas cushion support through a plurality of openings in the gas cushion support distributed over an area covered by the substrate. Interspersed with the openings that supply gas, openings that couple a vacuum source to the space between the gas cushion support and the substrate may also be provided. Differential operation of gas supply and vacuum supply to various openings can produce local pressure gradients in the gas cushion that can enable local control of the distance between a portion of the substrate and the gas cushion support. Differential adjustments to local gas and vacuum supply can be used to change the local clearance between the substrate and the support. This capability can be used to control and/or reduce variation in the clearance.

At 606, a plurality of proximity sensors is used to measure a plurality of distances between the substrate and the gas cushion support at different locations. The proximity sensors produce signals representing the distance from the proximity sensor to a surface of the substrate. For all the embodiments described herein, the proximity sensors are typically arranged such that a reference surface of each proximity sensor is located at or near the plane defined by the surface of the gas cushion support. The signal produced by the proximity sensor thus represents the distance from the surface of the gas cushion support to the substrate surface in locations near the proximity sensor.

At 608, signals from the proximity sensors are transmitted to a controller such as the system controller 129 of FIG. 1 for analysis and generation of control actions. The signals may be sent through wires, or wirelessly, and may be sent using a network such as a local area network, wifi network, or the internet.

At 610, the controller determines one or more control actions based on the signals received from the proximity sensors. The controller may average the signals as a representation of the average distance of the substrate from the support surface in the area over which the proximity sensors are distributed. Proximity sensors may be distributed over an area that includes the entire area of the substrate, or proximity sensors may be distributed over an area of focus that is less than the entire area of the substrate. For example, in precision printing applications, proximity sensors may be distributed over a print zone where print material is deposited on a substrate to achieve precise control of substrate position in the print zone. When the average distance of the substrate from the support surface is outside a tolerance, the controller may determine a control action of adjusting one or more of total gas flow to the gas cushion or total vacuum suction to the gas cushion to adjust the average distance.

The controller may also determine a variation in distance of the substrate from the support surface using variation in the signals from the proximity sensors, for example a standard deviation in the signals. If the standard deviation of the proximity signals is outside a tolerance, the controller may determine a control action of adjusting gas flow to one or more gas supply openings or vacuum suction to one or more vacuum openings to adjust the variation in signals from the proximity sensors.

For example, if variation in the signals from the proximity sensors is too high, the controller may identify the proximity sensor giving the maximum signal, determine gas supply openings and/or vacuum openings near the proximity sensor giving the maximum signal using a map comprising coordinates of the gas supply openings, the vacuum openings, and the proximity sensors, and determine a control action of adjusting gas flow to the one or more identified gas supply openings and/or vacuum openings to reduce the local distance from the gas cushion support to the substrate, and thus the signal received from the identified proximity sensor, and thus reduce variation among the signals from the proximity sensors. Likewise, the controller may determine a proximity sensor giving the minimum signal among the signals received from the proximity sensors, determine one or more gas supply openings and/or vacuum openings near the identified proximity sensor, and determine a control action of adjusting gas flow and/or vacuum flow to the identified one or more gas flow openings and/or vacuum openings to increase the local distance from the gas cushion support to the substrate, and thus the signal received from the identified proximity sensor, and thus reduce variation among the signals from the proximity sensors.

At 612, the controller sends the control action to the printer to adjust the gas and/or vacuum flows. The controller may apply the control actions stepwise, for example by changing a gas flow or vacuum set point from the current to the new value in one step, or in gradient by ramping from the current to the new value, or a combination thereof. The method 600 represents a control loop that may be executed repeatedly during a substrate positioning or printing process. For example, after the controller applies a control action, new signals are received from the proximity sensors, and a new analysis and control cycle can be performed to maintain control over substrate position during the process.

In one aspect of the method 600, a workpiece is disposed on a gas cushion support of an inkjet printer, and a gas cushion is established between the gas cushion support and the workpiece to support the workpiece above the surface of the gas cushion support. One or more proximity sensors disposed in the surface of the gas cushion support is used to detect a distance of the workpiece from the surface of the gas cushion support. The distance may be a local distance at one of the proximity sensors, or the distance may be an average distance reported by a plurality of proximity sensors. The distance may be the average distance of the entire workpiece from the support surface.

The determined distance is compared to a target distance. A difference between the determined distance and the target distance may be calculated, and the difference compared to a tolerance. If the difference is out of tolerance, a control action can be taken to adjust the distance, locally or globally, of the workpiece from the support surface. The control action may be any of adjusting total gas flow or vacuum suction to the gas cushion support surface, adjusting a local gas flow or vacuum suction to the gas cushion support surface, adjusting a global gas cushion pressure, and adjusting a local gas cushion pressure.

It should be noted that the proximity sensors used for the methods 500 and 600 may be all the same type of proximity sensors, or may be mixture of different types. For example, all the proximity sensors may be capacitive or acoustic, or a mixture of capacitive sensors and acoustic sensors may be used. Using different types of proximity sensors may reveal when certain environmental or process conditions are adversely affecting the signals coming from one or another type of sensor. For example, acoustic sensors may reveal whether an electrical anomaly, such as a surface static charge or a power failure, may be affecting signals from capacitive sensors.

In an aspect of the method 600, a workpiece is disposed on a gas cushion support of an inkjet printer, and a gas cushion is established between the gas cushion support and the workpiece to support the workpiece above the surface of the gas cushion support. A proximity sensor is used to detect a first distance of a first zone of the workpiece, and a second distance of a second zone of the workpiece, from the surface of the gas cushion support. The first zone and the second zone may be adjacent, or remote. For example, the first zone has a first boundary and the second zone has a second boundary. A portion of the first boundary may coincide with a portion of the second boundary. The first boundary may partially overlap with the second boundary. The first boundary may be separated from the second boundary such that no portion of the first boundary intersects with or overlaps any portion of the second boundary and the first and second boundaries are separated by a distance.

A controller determines the distances from signals sent by the proximity sensors to the controller. The controller then determines a first difference between the first distance and a target distance and a second difference between the second distance and the target distance. A first comparison is made between the first different and a tolerance, and a second comparison is made between the second difference and a tolerance. The first distance is then adjusted based on the first comparison and the second distance is adjusted based on the second comparison.

In this aspect, a first cell of the gas cushion corresponds to the first zone and a second cell of the gas cushion corresponds to the second zone. Gas is supplied to the first zone of the gas cushion by a first plurality of gas flow ports in the first zone that provide a first gas flow to the first cell. Gas is evacuated from the first cell by a vacuum source coupled to a first plurality of vacuum openings in the first zone that couple vacuum suction to the first cell. Gas pressure in the first cell is adjusted by changing one or more of the gas flow to the first cell or gas evacuation from the first cell. Gas is likewise supplied to the second zone of the gas cushion by a second plurality of gas flow ports in the second zone that provide a second gas flow to the second cell, which may be the same as, or different from, the first gas flow to the first cell. Gas is likewise evacuated from the second cell by a second plurality of vacuum openings in the second zone that coupled vacuum suction to the second cell. Gas pressure in the second cell is adjusted, independently of the first cell, by changing one or more of the gas flow the second cell or gas evacuation from the second cell. Thus, if the first comparison warrants a first control action comprising an adjustment to gas flow or vacuum suction to the first cell and the second comparison warrants a second control action comprising an adjustment to gas flow or vacuum suction to the second cell, those control actions can be implemented independently.

Data on substrate elevation can be used for other aspects of operating a substrate processing tool. For example, elevation of the substrate can indicate whether the substrate can be moved without contacting equipment above the substrate or above a location where the substrate would be moved. Substrate elevation can also be used to determine whether moving the substrate from one table to another, or from one table section to another, can be performed. If the table surfaces are at different heights, a higher elevation may be needed to safely transport the substrate from one surface to the other. The elevation data can also be analyzed statistically looking for signs of instability that might indicate malfunction of the gas cushion apparatus.

While the foregoing is directed to embodiments of the present invention, other and further embodiments of the present disclosure may be devised without departing from the basic scope thereof, and the scope thereof is determined by the claims that follow.

What is claimed is:

1. An inkjet printer, comprising:
   a gas cushion substrate support;
   a print assembly comprising a dispenser with an ejection surface facing the gas cushion substrate support; and
   a proximity sensor disposed in a surface of the gas cushion substrate support facing the ejection surface, wherein the proximity sensor is a capacitive sensor, an acoustic sensor, a pressure sensor, or a flow sensor, wherein the gas cushion substrate support comprises a plurality of gas flow openings formed in the surface of the gas cushion substrate support and at least one gas flow opening is between each pair of neighboring proximity sensors.

2. An inkjet printer, comprising:
   a gas cushion substrate support;
   a print assembly comprising a dispenser with an ejection surface facing the gas cushion substrate support; and
   a proximity sensor disposed in a surface of the gas cushion substrate support facing the ejection surface, wherein the proximity sensor is a capacitive sensor, an acoustic sensor, a pressure sensor, or a flow sensor, wherein the gas cushion substrate support comprises a plurality of gas flow openings formed in the surface of the gas cushion substrate support and the proximity sensor is disposed in a recess formed in the surface of the gas cushion substrate support and fluidly coupled with a gas flow opening.

3. An inkjet printer, comprising:
   a gas cushion substrate support;
   a print assembly comprising a dispenser with an ejection surface facing the gas cushion substrate support; and
   a proximity sensor disposed in a surface of the gas cushion substrate support facing the ejection surface, wherein the proximity sensor is a capacitive sensor, an acoustic sensor, a pressure sensor, or a flow sensor, wherein the proximity sensor is disposed in a recess formed in the surface of the gas cushion substrate support and the recess is fluidly coupled with a gas flow opening, a wiring attached to the proximity sensor is disposed through the gas flow opening, and the proximity sensor has a hole that fluidly couples the gas flow opening to the recess.

4. A method, comprising:
   disposing a workpiece on a gas cushion support of an inkjet printer;
   supporting the workpiece on a gas cushion above a surface of the gas cushion support;
   detecting a distance of the workpiece from the surface of the gas cushion support;
   determining a difference between the distance and a target distance;
   comparing the difference to a tolerance; and
   adjusting the distance of the workpiece from the surface of the gas cushion support based on the comparison.

5. The method of claim 4, wherein adjusting the distance of the workpiece from the surface of the gas cushion support comprises adjusting one or more of a gas flow to the gas cushion support, a gas evacuation flow from the gas cushion support, a global pressure of the gas cushion, and a local pressure of the gas cushion.

6. The method of claim 4, wherein detecting a distance of the workpiece from the surface of the gas cushion support comprises receiving a proximity signal from one or more proximity sensors.

7. The method of claim 6, wherein the one or more proximity sensors includes a capacitive sensor, an acoustic sensor, or an optical sensor.

8. The method of claim 7, wherein the one or more proximity sensors includes two different kinds of proximity sensors.

9. A method, comprising:
   disposing a workpiece on a gas cushion support of an inkjet printer;
   supporting the workpiece on a gas cushion above a surface of the gas cushion support;
   detecting a first distance of a first zone of the workpiece from the surface of the gas cushion support;
   detecting a second distance of a second zone of the workpiece from the surface of the gas cushion support;
   determining a first difference between the first distance and a target distance;
   determining a second difference between the second distance and the target distance;
   performing a first comparison of the first difference to a tolerance;
   performing a second comparison of the second difference to the tolerance;
   adjusting the first distance based on the first comparison; and
   adjusting the second distance based on the second comparison.

10. The method of claim 9, wherein adjusting the first distance comprises adjusting one or more of a gas flow to a first cell of the gas cushion support corresponding to the first zone of the workpiece, a gas evacuation flow from the first cell of the gas cushion support, a global pressure of the gas cushion, and a local pressure of the gas cushion at the first cell, and adjusting the second distance comprises adjusting one or more of a gas flow to a second cell of the gas cushion support corresponding to the second zone of the workpiece, a gas evacuation flow from the second cell of the gas cushion support, a global pressure of the gas cushion, and a local pressure of the gas cushion at the second cell.

11. The method of claim 10, wherein the first and second cells of the gas cushion support are adjacent.

12. The method of claim 10, wherein the first and second cells of the gas support cushion are spaced apart.

* * * * *